(12) United States Patent
Okada et al.

(10) Patent No.: US 10,690,046 B2
(45) Date of Patent: Jun. 23, 2020

(54) INTERNAL COMBUSTION ENGINE FOR SADDLE-RIDE TYPE VEHICLE

(71) Applicant: HONDA MOTOR CO., LTD., Tokyo (JP)

(72) Inventors: Nozomi Okada, Wako (JP); Hiroto Takeichi, Wako (JP); Naoya Matsunaga, Wako (JP); Kazuma Tanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 165 days.

(21) Appl. No.: 15/720,223

(22) Filed: Sep. 29, 2017

(65) Prior Publication Data
US 2018/0094575 A1    Apr. 5, 2018

(30) Foreign Application Priority Data
Sep. 30, 2016    (JP) .................. 2016-192851

(51) Int. Cl.
*F02B 61/02*    (2006.01)
*F02N 15/00*    (2006.01)
(Continued)

(52) U.S. Cl.
CPC .............. *F02B 61/02* (2013.01); *B60K 23/02* (2013.01); *B62M 7/02* (2013.01); *B62M 7/06* (2013.01);
(Continued)

(58) Field of Classification Search
CPC .......... F02B 61/02; F02B 39/04; B60K 23/02; B60W 10/02; B60W 10/11; F02N 15/006; B62M 7/06; B62M 7/02
See application file for complete search history.

(56) References Cited

U.S. PATENT DOCUMENTS

2006/0260582 A1    11/2006  Takano
2008/0022981 A1    1/2008   Keyaki et al.
(Continued)

FOREIGN PATENT DOCUMENTS

JP        3-20139 A      1/1991
JP     2003-127961 A    5/2003
(Continued)

OTHER PUBLICATIONS

Extended European Search Report for European Application No. 17186396.2, dated Feb. 13, 2018.

*Primary Examiner* — Jacob M Amick
(74) *Attorney, Agent, or Firm* — Birch, Stewart, Kolasch & Birch, LLP

(57) ABSTRACT

In an internal combustion engine for a saddle-ride type vehicle, in which a generator and a clutch are distributed and arranged on opposite sides in an axial direction of a crankshaft, a starting power transmission mechanism is arranged between a cylinder bore and the generator in a direction along an axis of the crankshaft, the starting power transmission mechanism transmitting starting power from a starter motor to the crankshaft, the starter motor being mounted on an outer surface of a crankcase. A crankcase cover covering the generator and the starting power transmission mechanism is mounted on the crankcase on a side opposite to the clutch. A release rod of a clutch release lever switching transmission and cutoff of power of the clutch is turnably supported to the crankcase cover at a side position of the generator.

9 Claims, 7 Drawing Sheets

(51) Int. Cl.
  *B60K 23/02*   (2006.01)
  *B62M 7/04*    (2006.01)
  *F02B 39/04*   (2006.01)
  *B62M 7/06*    (2006.01)
  *F02N 11/00*   (2006.01)
  *B62M 7/02*    (2006.01)

(52) U.S. Cl.
  CPC .............. *F02B 39/04* (2013.01); *F02N 11/00* (2013.01); *F02N 15/006* (2013.01)

(56) References Cited

U.S. PATENT DOCUMENTS

2008/0072861 A1\* 3/2008 Takano ................... F02N 11/00
                                                                       123/179.25
2014/0296029 A1   10/2014 Mukouhara

FOREIGN PATENT DOCUMENTS

| JP | 2007-270652 A | 10/2007 |
| JP | 2008-75572 A | 4/2008 |
| JP | 2011-174516 A | 9/2011 |
| JP | 2014-193651 A | 10/2014 |
| JP | 2016-109287 A | 6/2016 |
| JP | 2016-172524 A | 9/2016 |
| WO | WO 2009/122825 A1 | 10/2009 |

\* cited by examiner

INTERNAL COMBUSTION ENGINE FOR SADDLE-RIDE TYPE VEHICLE

BACKGROUND OF THE INVENTION

Field of Invention

The present invention relates to an internal combustion engine for a saddle-ride type vehicle, in which a generator driven by a crankshaft and a clutch interposed between the crankshaft and a transmission are distributed and arranged on opposite sides in an axial direction of the crankshaft rotatably supported to a crankcase, and a cylinder body having a cylinder bore is combined with the crankcase.

Description of the Related Art

There has been known the following internal combustion engine for a saddle-ride type vehicle disclosed in Japanese Patent Application Laid-Open No. 2011-174516. Heavy loads are arranged by distributing the heavy loads to left and right such that a generator and a starting power transmission mechanism are arranged at one side in a direction along an axis of a crankshaft and a clutch is arranged at another side in the direction along the axis of the crankshaft, thus satisfying a left and right weight balance. A release rod of a clutch release lever that switches transmission and cutoff of power of the clutch is supported to a clutch cover that covers the clutch to be combined with a crankcase.

Incidentally, at the internal combustion engine disclosed in Japanese Patent Application Laid-Open No. 2011-174516, the satisfactory left and right balance is obtained. However, it is required to consider disposition of the starting power transmission mechanism and the clutch release lever for achieving downsizing of the internal combustion engine in the direction along the axis of the crankshaft.

SUMMARY OF THE INVENTION

The present invention has been made in view of the above-described circumstances, and an object of the present invention is to provide an internal combustion engine for a saddle-ride type vehicle that, after disposing a generator and a clutch on opposite sides in a direction along an axis of a crankshaft to obtain a left and right weight balance, ensures downsizing in the direction along the axis of the crankshaft by considering disposition of a clutch release lever.

In order to achieve the object, according to a first feature of the present invention, there is provided an internal combustion engine for a saddle-ride type vehicle, in which a generator driven by a crankshaft and a clutch interposed between the crankshaft and a transmission are distributed and arranged on opposite sides in an axial direction of the crankshaft rotatably supported to a crankcase, and a cylinder body having a cylinder bore is combined with the crankcase, wherein a starting power transmission mechanism is arranged between the cylinder bore and the generator in a direction along an axis of the crankshaft, the starting power transmission mechanism transmitting starting power from a starter motor to the crankshaft, the starter motor being mounted on an outer surface of the crankcase, a crankcase cover is mounted on the crankcase on a side opposite to the clutch, the crankcase cover covering the generator and the starting power transmission mechanism, and a release rod of a clutch release lever is turnably supported to the crankcase cover at a side position of the generator, the clutch release lever switching transmission and cutoff of power of the clutch.

With the first feature of the present invention, a part displaced laterally from the generator of the crankcase cover that covers the generator and the starting power transmission mechanism to be mounted on the crankcase is caused to have a function that turnably supports the release rod of the clutch release lever. This can reduce an outward extension of the crankcase cover to ensure a disposing space of the clutch release lever on the crankcase cover side. This can also reduce an outward extension of the clutch cover to contribute to downsizing of the internal combustion engine in the axial direction of the crankshaft.

According to a second feature of the present invention, in addition to the first feature, a cam chain driving sprocket is disposed at the crankshaft so as to mesh with a cam chain, the cam chain driving sprocket being arranged between the cylinder bore and the clutch in the direction along the axis of the crankshaft.

With the second feature of the present invention, the cam chain driving sprocket arranged between the cylinder bore and the clutch is disposed at the crankshaft. This can arrange the generator and the starting power transmission mechanism more adjacent to the cylinder bore side. This can also arrange the clutch release lever on a side closer to the crankcase. Thus, this can more contribute to the downsizing of the internal combustion engine in the axial direction of the crankshaft.

According to a third feature of the present invention, in addition to the first feature or the second feature, a drive chain driving sprocket is secured to an output shaft of the transmission outside the crankcase cover, the drive chain driving sprocket meshing with a drive chain that transmits rotative power from the crankshaft to a drive wheel, and a part of a drive sprocket cover is stacked on the crankcase cover from outside and fastened to the crankcase together with the crankcase cover, the drive sprocket cover covering the drive chain driving sprocket from outside.

With the third feature of the present invention, a part of the drive sprocket cover that covers the drive chain driving sprocket from outside is fastened to the crankcase together with the crankcase cover. The drive chain driving sprocket is arranged outside the crankcase cover so as to mesh with the drive chain. This can ensure easily a disposing space of a fastening boss of the crankcase cover and the drive sprocket cover in the crankcase and enhance maintainability.

According to a fourth feature of the present invention, in addition to the second feature or the third feature, a chain guiding member is clamped between the drive sprocket cover and the crankcase cover, the chain guiding member guiding the drive chain, a rod supporting portion is arranged at a position separating from the chain guiding member in a direction along an axis of the output shaft, the rod supporting portion being formed on the crankcase cover so as to turnably support the release rod of the clutch release lever.

With the fourth feature of the present invention, the chain guiding member is clamped between the drive sprocket cover and the crankcase cover, and the rod supporting portion formed on the crankcase cover so as to turnably support the release rod is arranged separating from the chain guiding member in the direction along the axis of the output shaft. This can reduce transmission of an excessive load from the chain guiding member to the rod supporting portion caused by bulge of the drive chain, so as to smooth turning movement of the clutch release lever.

According to a fifth feature of the present invention, in addition to the first feature or the second feature, a part of the starting power transmission mechanism is configured with a first intermediate gear and a second intermediate gear, the first intermediate gear rotating around an axis parallel to the crankshaft, the second intermediate gear being formed having a diameter smaller than a diameter of the first intermediate gear and rotating with the first intermediate gear, and the release rod and the first and second intermediate gears are arranged adjacently so as to sandwich the first intermediate gear between the release rod and the second intermediate gear in a direction along rotation axes of the first and second intermediate gears.

With the fifth feature of the present invention, the first intermediate gear and the second intermediate gear having the diameter smaller than the diameter of the first intermediate gear, and the release rod are arranged adjacently so as to sandwich the first intermediate gear between the release rod and the second intermediate gear. The first intermediate gear and the second intermediate gear constitute a part of the starting power transmission mechanism. This allows the starting power transmission mechanism and the clutch release lever to be arranged adjacently by sandwiching the crankcase cover, so as to ensure more downsizing of the internal combustion engine.

According to a sixth feature of the present invention, in addition to the fifth feature, the starting power transmission mechanism includes a driven gear and a third intermediate gear, the driven gear being coaxial with the crankshaft, the third intermediate gear meshing with the second intermediate gear, and a support plate is arranged between the first and second intermediate gears on a projection view to a planar surface including an axis of a support shaft and the rotation axes of the first and second intermediate gears, the support plate supporting the support shaft and being secured to the crankcase, the support shaft rotatably supporting the third intermediate gear.

With to the sixth feature of the present invention, the starting power transmission mechanism includes the driven gear and the third intermediate gear. The driven gear is coaxial with the crankshaft. The third intermediate gear meshes with the second intermediate gear. The support plate is arranged between the first and second intermediate gears on the projection view to the planar surface including the axis of the support shaft and the rotation axes of the first and second intermediate gears. The support plate supports the support shaft and is secured to the crankcase. The support shaft rotatably supports the third intermediate gear. This can downsize the driven gear to bring the first and second intermediate gears closer to the crankshaft side with the configuration that interposes the third intermediate gear between the second intermediate gear and the driven gear. This can also contribute to the downsizing of the internal combustion engine.

The above and other objects, characteristics and advantages of the present invention will be clear from detailed descriptions of the preferred embodiment which will be provided below while referring to the attached drawings.

DESCRIPTION OF THE PREFERRED EMBODIMENT

The following describes an embodiment of the present invention referring to the accompanying FIG. 1 to FIG. 7. The following description defines the up, down, front, rear, right, and left as directions viewed from an occupant riding on a two-wheeled motor vehicle.

Figure 1:
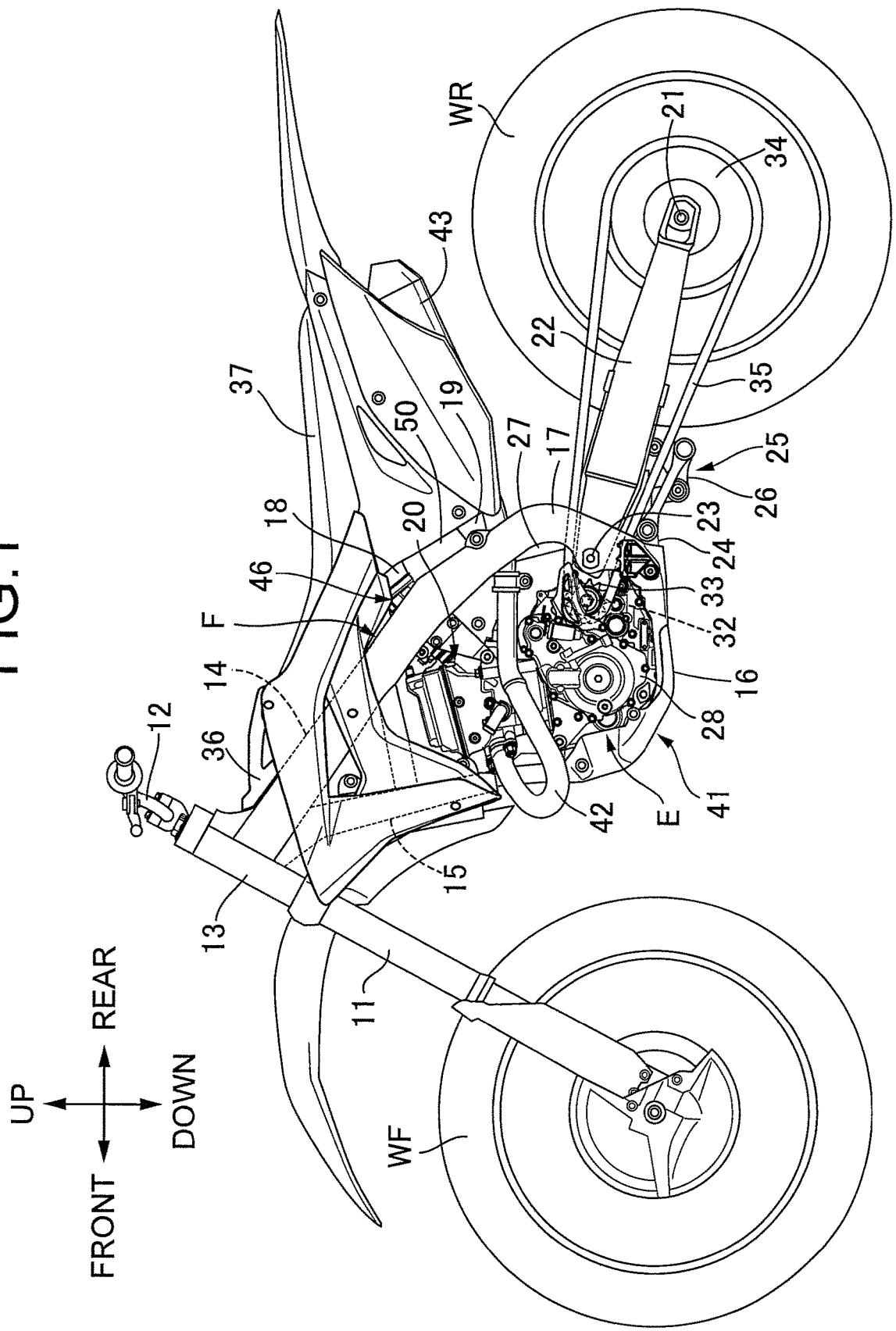
FIG. 1 is a left side view of a two-wheeled motor vehicle.

First, in FIG. 1, an irregular ground travelling two-wheeled motor vehicle has a body frame F. The body frame F includes a head pipe 13, a pair of left and right main frames 14, a down frame 15, a pair of left and right lower frames 16, a pair of left and right pivot frames 17, a pair of left and right seat rails 18, and a pair of left and right rear frames 19. The head pipe 13 steerably supports a front fork 11 and a bar-shaped steering handlebar 12. The front fork 11 journals a front wheel WF. The pair of left and right main frames 14 extend downward to the rear from the head pipe 13. The down frame 15 extends downward to the rear from the head pipe 13 at a steeper angle with respect to these main frames 14. The pair of left and right lower frames 16 are continuous with a lower end portion of the down frame 15 to extend rearward. The pair of left and right pivot frames 17 have upper end portions integrally continuous with rear end portions of the main frames 14 to extend downward. The pair of left and right pivot frames 17 have lower end portions continuous with rear end portions of both of the lower frames 16. The pair of left and right seat rails 18 are continuous with the rear end portions of the main frames 14 to extend rearward. The pair of left and right rear frames 19 have front end portions coupled to intermediate portions in an up-down direction of both of the pivot frames 17 to extend upward to the rear. The pair of left and right rear frames 19 have rear end portions coupled to the pivot frames 17.

On the body frame F, an engine body 20 of a single-cylinder internal combustion engine E is mounted so as to be arranged underneath the main frames 14 as seen in a side view. A rear wheel WR is a drive wheel. The rear wheel WR has an axle 21 journaled to rear end portions of a swing arm 22. The swing arm 22 has front end portions supported swingably in the up-down direction to lower portions of the pivot frames 17 at the body frame F via a spindle 23.

A link mechanism 25 is disposed between a bracket 24 and the swing arm 22. The bracket 24 is disposed at the lower portions of the pivot frames 17 at the body frame F. A rear cushion unit 27 that extends in the up-down direction is disposed between a link member 26 and upper portions of the pivot frames 17. The link member 26 constitutes a part of the link mechanism 25.

A crankcase 28 constitutes a part of the engine body 20. The crankcase 28 houses a transmission 52 (see FIG. 4). This transmission 52 includes an output shaft 32 that projects to a left side from the crankcase 28. An endless drive chain 35 is wound around a drive chain driving sprocket 33 disposed at the output shaft 32 and a driven sprocket 34 disposed at the axle 21 of the rear wheel WR.

Above the engine body 20 and on both of the main frames 14, a fuel tank 36 is disposed. At the rear of this fuel tank 36, a riding seat 37 is arranged so as to be supported by the seat rails 18.

Figure 2:
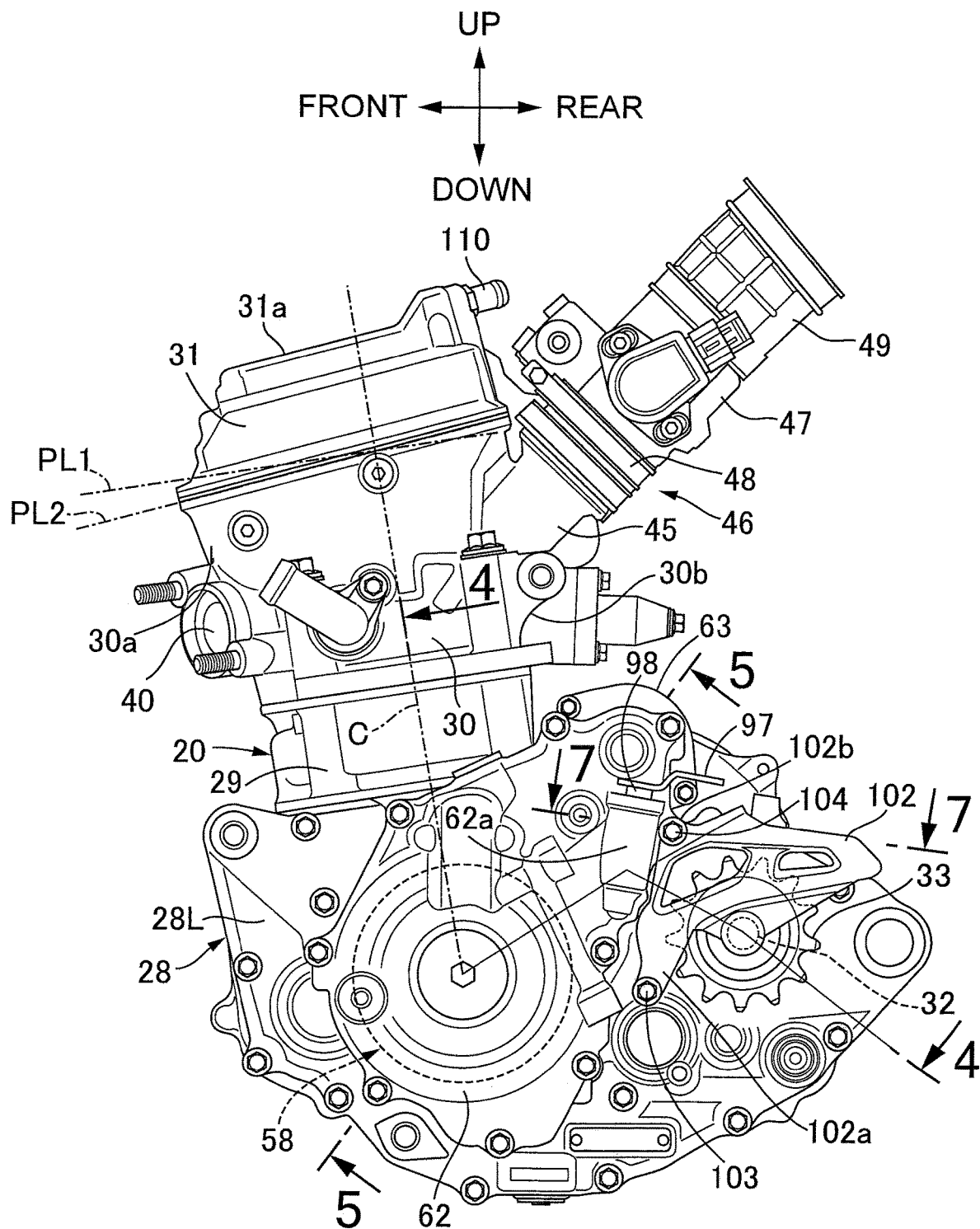
FIG. 2 is a left side view of an internal combustion engine.
Figure 3:
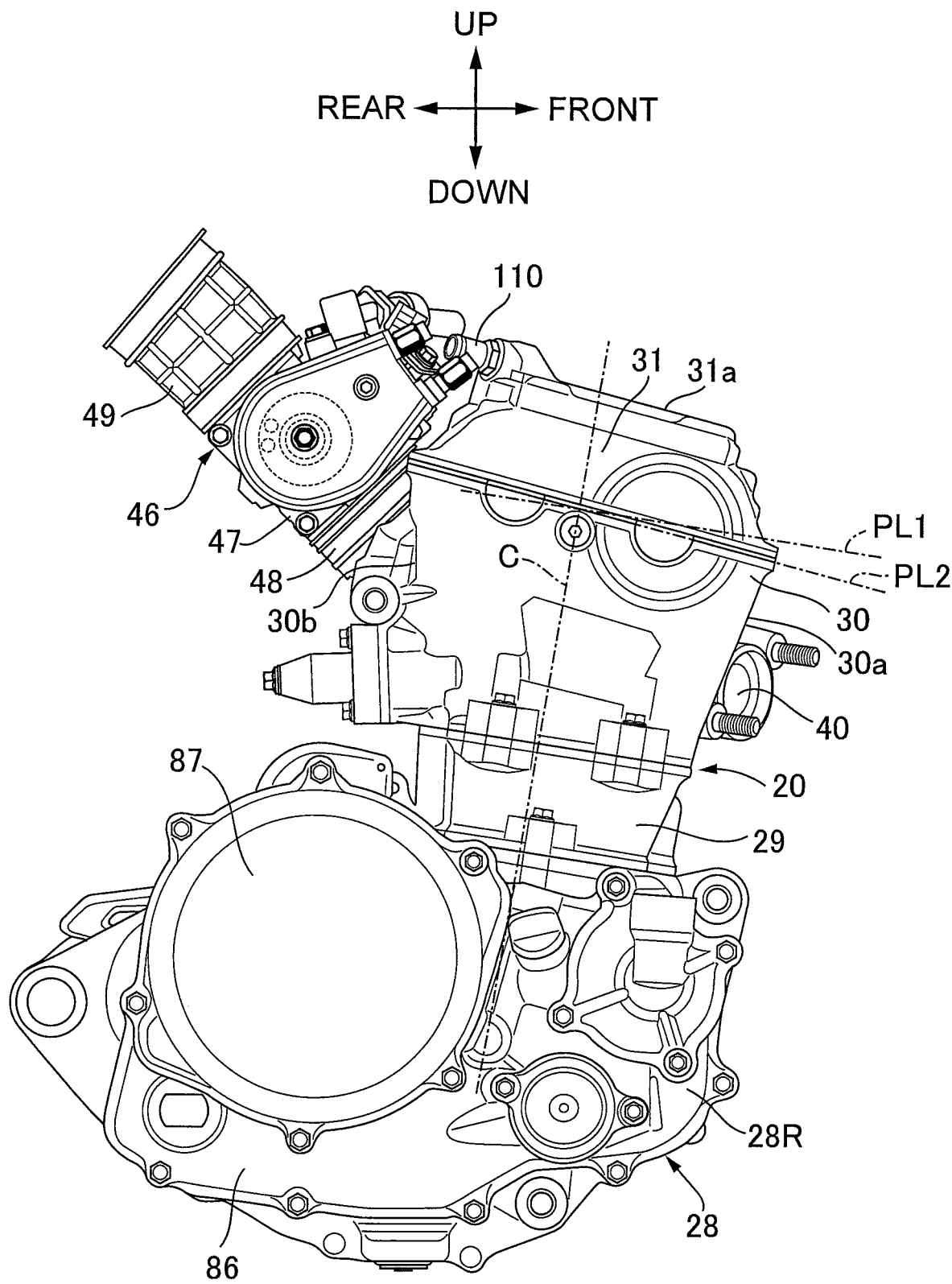
FIG. 3 is a right side view of the internal combustion engine.

With reference to FIG. 2 and FIG. 3 together, the engine body 20 includes the crankcase 28, a cylinder body 29, a cylinder head 30, and a head cover 31. The cylinder body 29 is combined with a front side upper portion of the crankcase 28 to extend upward. The cylinder head 30 is combined with an upper portion of the cylinder body 29. The head cover 31 is combined with an upper portion of the cylinder head 30. The engine body 20 is mounted on the body frame F in a posture where a cylinder axis C is slightly inclined forward. The cylinder head 30 and the head cover 31 are mutually combined on a second planar surface PL2 that intersects with the cylinder axis C. The second planar surface PL2 has a forward inclination angle slightly larger than that of a first planar surface PL1. The first planar surface PL1 inclines upward as proceeding rearward along a vehicle front-rear direction to be perpendicular to the cylinder axis C.

The cylinder head 30 has a front wall 30a at which a pair of left and right exhaust ports 40 are disposed. As clearly illustrated in FIG. 1, the internal combustion engine E includes an exhaust system 41 including a pair of exhaust pipes 42 and a pair of left and right mufflers 43. The pair of exhaust pipes 42 have upstream end portions coupled to the exhaust ports 40 to wrap around left and right of the engine body 20. The pair of left and right mufflers 43 are each coupled to downstream ends of these exhaust pipes 42 to be arranged above the rear wheel WR.

The cylinder head 30 has a rear wall 30b at which an intake coupling pipe portion 45 is protrusively provided rearward and obliquely upward. The intake coupling pipe portion 45 forms a single intake port (not illustrated). The internal combustion engine E includes an intake device 46 including a throttle body 47, an insulator 48, a connecting tube 49, and an air cleaner 50 (see FIG. 1). The throttle body 47 adjusts air volume supplied to the intake port. The insulator 48 couples the intake coupling pipe portion 45 to the throttle body 47. The connecting tube 49 has a downstream end coupled to an upstream end of the throttle body 47. The air cleaner 50 is arranged underneath the riding seat 37 so as to be coupled to an upstream end of the connecting tube 49.

Figure 4:
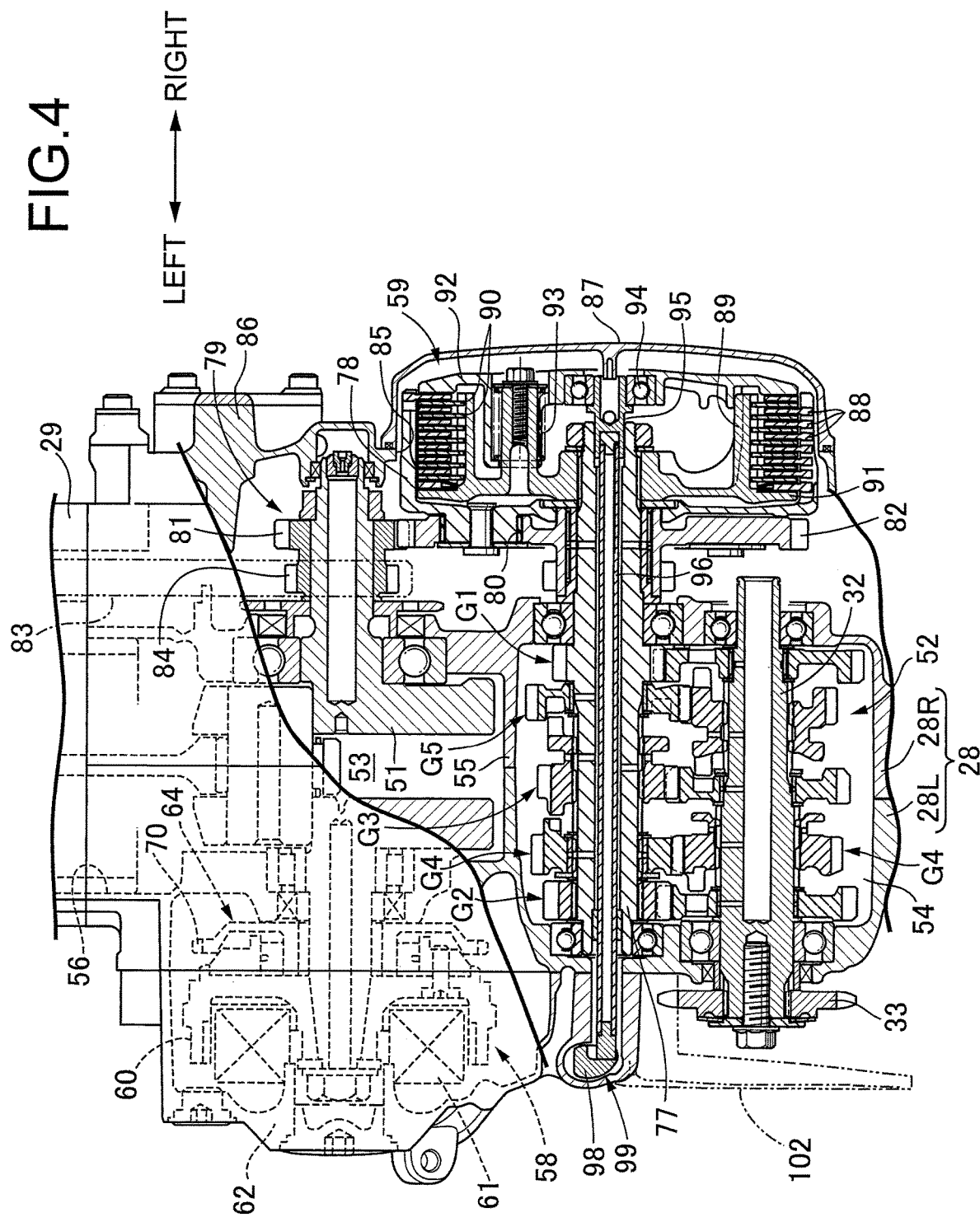
FIG. 4 is a sectional view taken along the line 4-4 in FIG. 2.

In FIG. 4, the crankcase 28 is formed by combining a left case half body 28L arranged at a left side in a vehicle width direction with a right case half body 28R arranged at a right side in the vehicle width direction. A crankshaft 51 having an axis extending in the vehicle width direction is rotatably supported to this crankcase 28.

Inside the crankcase 28, a crank chamber 53 and a transmission chamber 54 are formed by interposing a division wall 55 between the crank chamber 53 and the transmission chamber 54. The crank chamber 53 houses a main part of the crankshaft 51. The transmission chamber 54 houses the transmission 52. At the cylinder body 29, a cylinder bore 56 that are communicated with the crank chamber 53 is formed.

At opposite sides in an axial direction of the crankshaft 51, a generator 58 and a clutch 59 are distributed to be arranged. The generator 58 is driven by the crankshaft 51. The clutch 59 is interposed between the crankshaft 51 and the transmission 52. In the embodiment, the generator 58 is arranged at a left side along the axis of the crankshaft 51, and the clutch 59 is arranged at a right side along the axis of the crankshaft 51.

Figure 5:
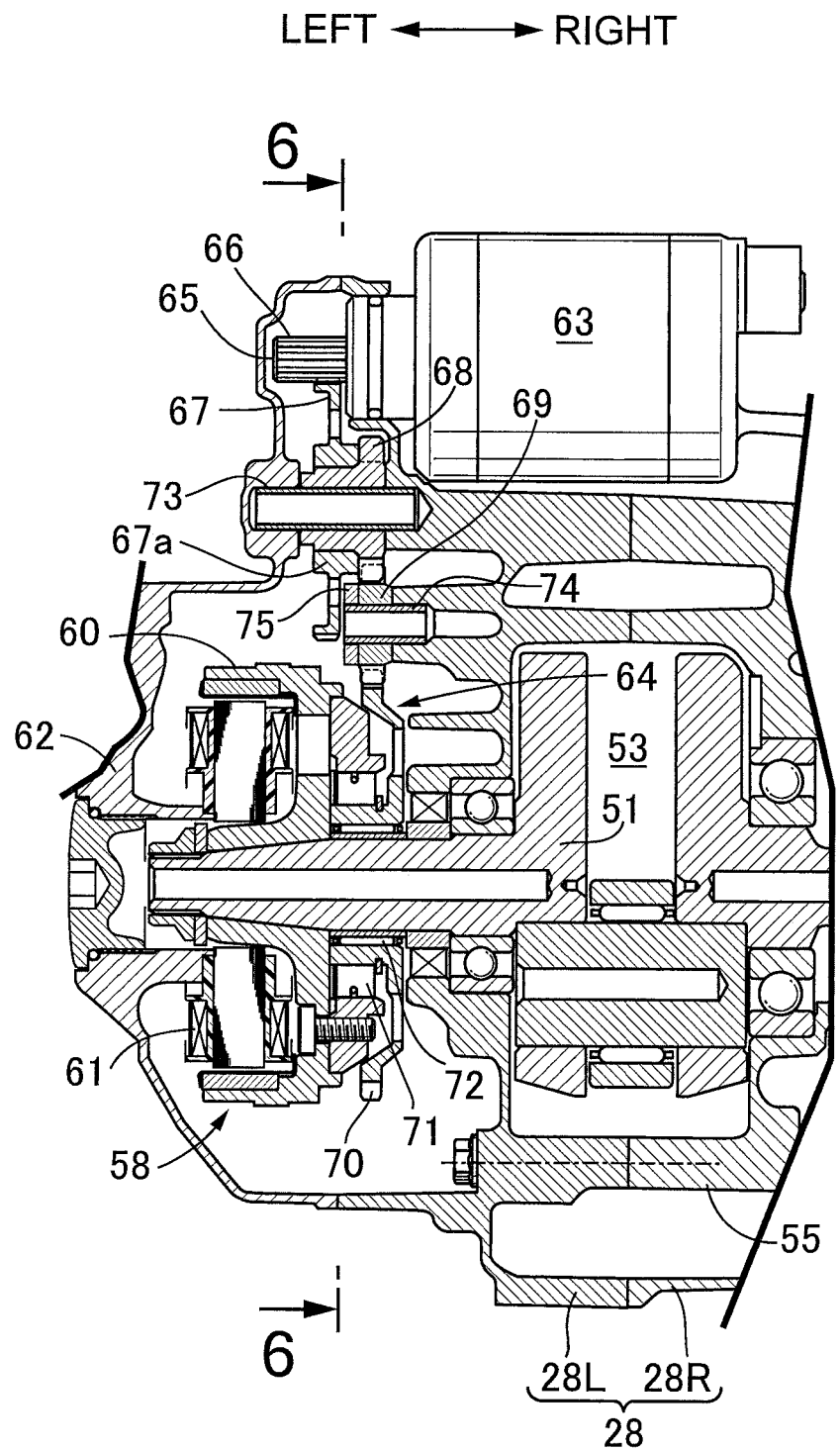
FIG. 5 is a sectional view taken along the line 5-5 in FIG. 2.

With reference to FIG. 5 together, the generator 58 includes a rotor 60 and a stator 61. The rotor 60 is secured to the crankshaft 51. The stator 61 is arranged inside the rotor 60. The stator 61 is secured to a crankcase cover 62. The crankcase cover 62 is fastened to the left case half body 28L of the crankcase 28 so as to cover the generator 58.

Figure 6:
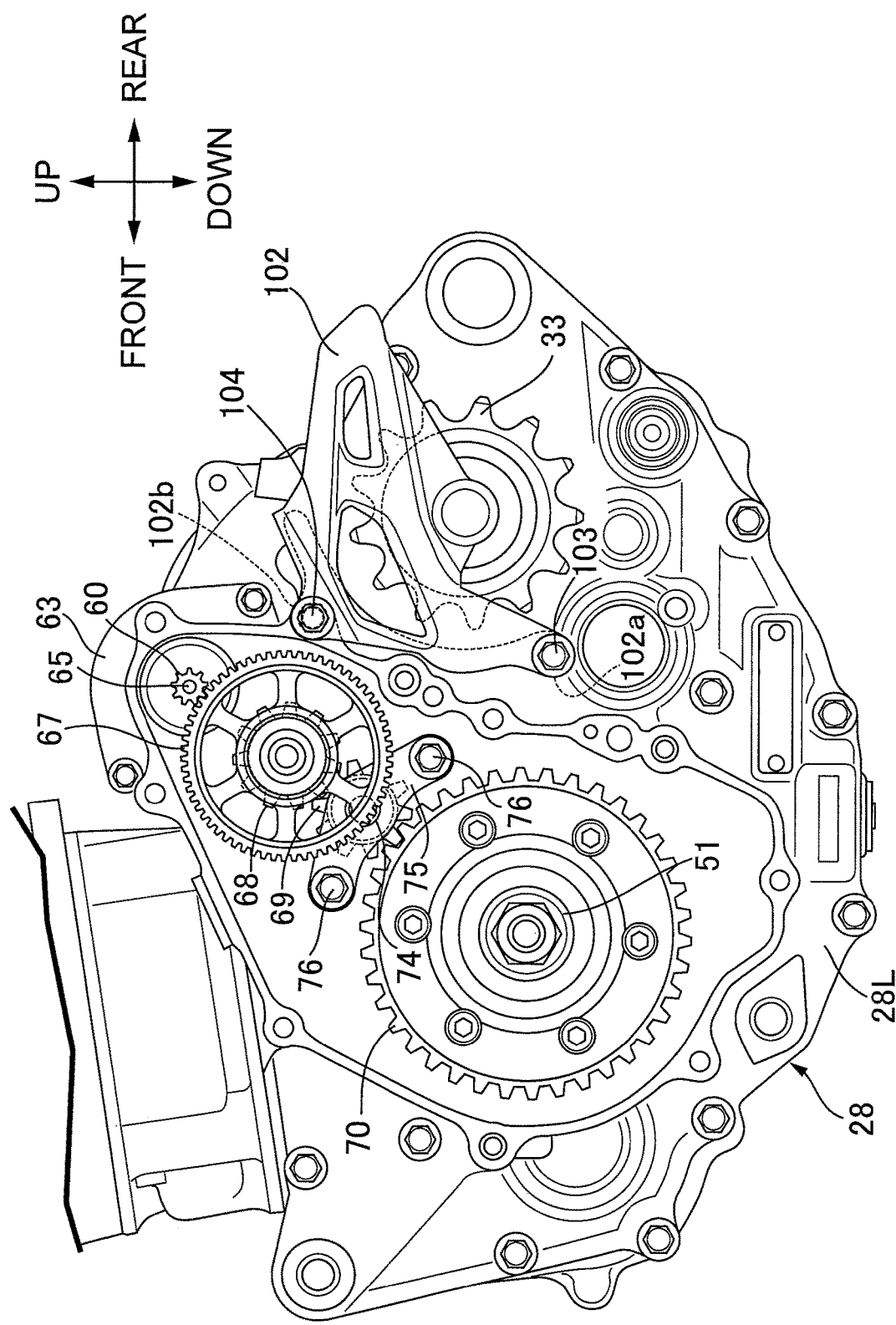
FIG. 6 is a left side view of a crankcase viewed from the line 6-6 in FIG. 5.

With reference to FIG. 6 together, a starting power transmission mechanism 64 is arranged between the cylinder bore 56 of the cylinder body 29 and the generator 58 in the direction along the axis of the crankshaft 51. The starting power transmission mechanism 64 transmits starting rotative power from a starter motor 63 to the crankshaft 51. This starting power transmission mechanism 64 is covered with the crankcase cover 62 together with the generator 58 from an opposite side of the clutch 59.

The starter motor 63 is disposed on an upper portion of the crankcase 28 at the rearward along the vehicle front-rear direction of the cylinder body 29. The starting power transmission mechanism 64 includes a driving gear 66, a first intermediate gear 67, a second intermediate gear 68, a third intermediate gear 69, and a driven gear 70. The driving gear 66 is disposed at a motor shaft 65 of the starter motor 63. The first intermediate gear 67 meshes with the driving gear 66. The second intermediate gear 68 is arranged coaxial with the first intermediate gear 67 so as to rotate with the first intermediate gear 67. The third intermediate gear 69 meshes with the second intermediate gear 68. The driven gear 70 meshes with the third intermediate gear 69. The driven gear 70 interposes a one-way clutch 71 between the driven gear 70 and the rotor 60 of the generator 58 to be arranged coaxial with the crankshaft 51. A needle bearing 72 is interposed between the crankshaft 51 and the driven gear 70.

The second intermediate gear 68 is formed to have a diameter smaller than that of the first intermediate gear 67. The second intermediate gear 68 is integrally formed with an intermediate rotation shaft 73. The intermediate rotation shaft 73 has opposite ends in an axial direction rotatably supported to the left case half body 28L of the crankcase 28 and the intermediate rotation shaft 73. The first intermediate gear 67 is secured to the intermediate rotation shaft 73 at a position sandwiching the second intermediate gear 68 between the first intermediate gear 67 and the left case half body 28L. This first intermediate gear 67 integrally has a cylindrically-shaped boss portion 67a. The boss portion 67a has opposite ends that abut against the second intermediate gear 68 and an inner surface of the crankcase cover 62.

The third intermediate gear 69 is rotatably supported by a support shaft 74. The support shaft 74 has one end portion inserted into and supported to the left case half body 28L of the crankcase 28. This support shaft 74 is supported by a support plate 75 into which another end portion of the support shaft 74 is pressed. As illustrated in FIG. 6, the support plate 75 is secured to the left case half body 28L of the crankcase 28 by a pair of bolts 76. Moreover, the support plate 75 is arranged between the first and second intermediate gears 67, 68 on a projection view (on FIG. 5) to a planar surface including an axis of the support shaft 74 and rotation axes of the first intermediate gear 67 and the second intermediate gear 68, that is, an axis of the intermediate rotation shaft 73.

Focusing on FIG. 4 again, the transmission 52 is constituted by including gear trains having a plurality of gear shift stages capable of being alternatively established, for example, first to fifth speed gear trains G1, G2, G3, G4, and G5 between an input shaft 77 and the output shaft 32. The input shaft 77 has an axis parallel to the crankshaft 51 and is rotatably supported on the left and right case half bodies 28L, 28R. The output shaft 32 has an axis parallel to the input shaft 77 and is rotatably supported on both of the case half bodies 28L, 28R. The drive chain driving sprocket 33 is secured to an end portion projecting from the left case half body 28L of the output shaft 32.

The crankshaft 51 and the input shaft 77 have right end portions in the vehicle width direction. The right end portions project from the right case half body 28R of the crankcase 28. The clutch 59 is mounted on the right end portion of the input shaft 77. The clutch 59 switches coupling and cutting of power between the crankshaft 51 and the input shaft 77. The clutch 59 has a clutch outer 78 to which rotative power of the crankshaft 51 is transmitted via a primary speed-reduction device 79 and a damper 80. This primary speed-reduction device 79 is configured with a primary driving gear 81 and a primary driven gear 82. The primary driving gear 81 is secured to the right end portion of the crankshaft 51. The primary driven gear 82 is relatively rotatably supported to the input shaft 77 so as to mesh with the primary driving gear 81. This primary driven gear 82 is coupled to the clutch outer 78 via the damper 80. The clutch outer 78 is relatively rotatably supported to the input shaft 77.

A cam chain driving sprocket 84 is arranged between the cylinder bore 56 and the clutch 59 in the direction along the axis of the crankshaft 51, between the primary speed-reduction device 79 and the cylinder bore 56 in the embodiment. The cam chain driving sprocket 84 meshes with a cam chain 83. This cam chain driving sprocket 84 is integrally disposed at the crankshaft 51.

A right crankcase cover 86 is fastened to the right case half body 28R so as to cover a part of the primary speed-reduction device 79. The right crankcase cover 86 has an opening portion 85 to which a part of the clutch 59 is faced. The clutch 59 is covered with a clutch cover 87. The clutch cover 87 is fastened to the right crankcase cover 86 so as to close the opening portion 85.

The clutch 59 includes the clutch outer 78, a plurality of friction plates 88, a clutch inner 89, a plurality of friction plates 90, a pressure receiving plate 91, a pressing member 92, a clutch spring 93, and a lifter 95. The clutch outer 78 is relatively rotatably supported to one end portion of the input shaft 77. The plurality of friction plates 88 are engaged with this clutch outer 78. The clutch inner 89 is relatively unrotatably combined with the input shaft 77. The plurality of friction plates 90 are alternately disposed with the friction plates 88 and engaged with the clutch inner 89. The pressure receiving plate 91 is integrally disposed at the clutch inner 89 with being opposed to the inward friction plates in the axial direction of the alternately arranged friction plates 88, 90. The pressing member 92 sandwiches the alternately arranged friction plates 88, 90 between the pressing member 92 and the pressure receiving plate 91. The clutch spring 93 biases the pressing member 92 to a side press-bonding the friction plates 88, 90 between the clutch spring 93 and the pressure receiving plate 91. The lifter 95 is coupled to an inner peripheral portion of the pressing member 92 via a release bearing 94.

The input shaft 77 of the transmission 52 is formed into a cylindrical shape whose inside is hollow. A pressing rod 96 is inserted into the input shaft 77 movably in the axial direction. The pressing rod 96 has one end portion that abuts against the lifter 95. Pressing the lifter 95 with this pressing rod 96 makes a state where the clutch 59 cuts off power transmission between the clutch outer 78 and the clutch inner 89.

The clutch release lever 97 has a release rod 98. The release rod 98 turns to drive the pressing rod 96 in the axial direction. The release rod 98 coupled to another end portion of the pressing rod 96 via a cam mechanism 99 is turnably supported to the crankcase cover 62.

Figure 7:
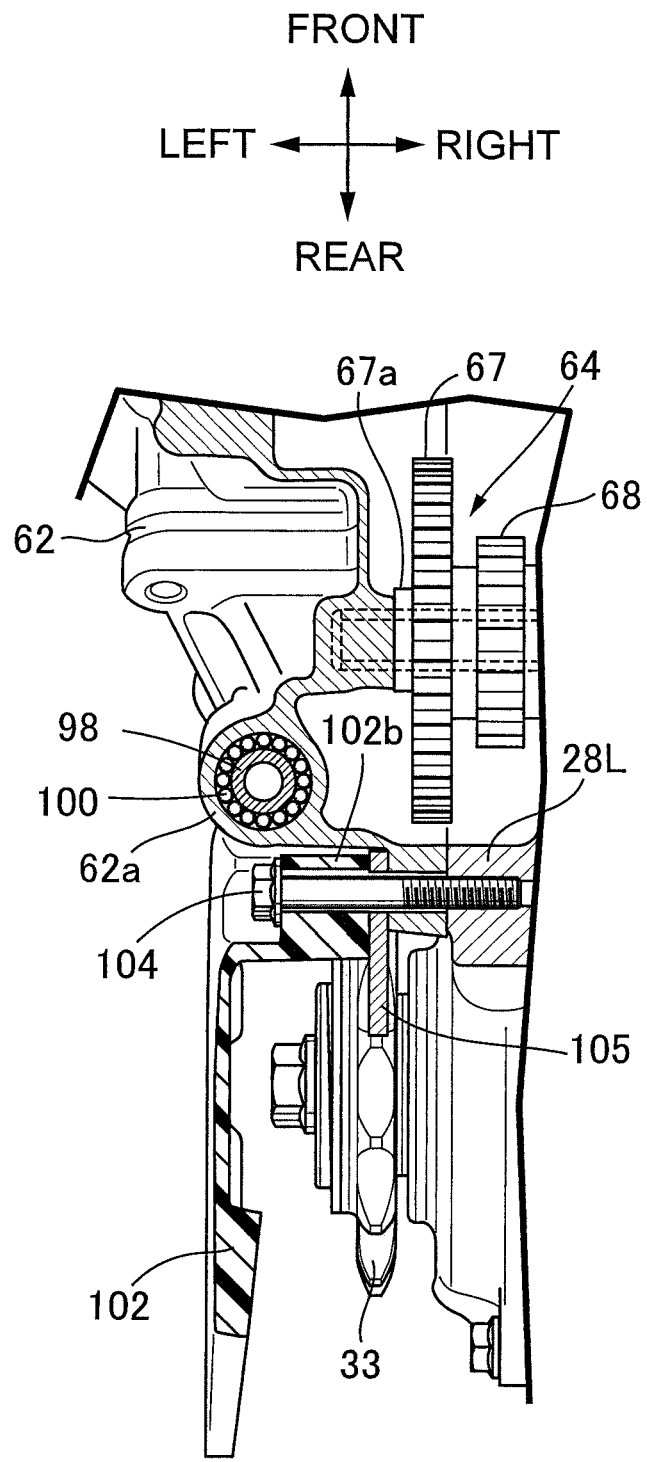
FIG. 7 is a sectional view taken along the line 7-7 in FIG. 2.

With reference to FIG. 7 together, the release rod 98 is turnably supported via a bearing 100 to a tubular rod supporting portion 62a formed on the crankcase cover 62. This release rod 98 has an end portion projecting from the rod supporting portion 62a. A clutch release lever 97 is disposed at the projecting end portion.

As illustrated in FIG. 2, the rod supporting portion 62a is formed on the crankcase cover 62 at a side position of the generator 58, at a position displaced rearward and obliquely upward in the vehicle front-rear direction from the generator 58 in the embodiment. The release rod 98 will be turnably supported to the crankcase cover 62 at the side position of the generator 58.

Moreover, the release rod 98, and the first and second intermediate gears 67, 68 of the starting power transmission mechanism 64 are arranged adjacently so as to sandwich the first intermediate gear 67 between the release rod 98 and the second intermediate gear 68 as clearly illustrated in FIG. 7.

The drive chain driving sprocket 33 is secured to the output shaft 32 of the transmission 52 outside the crankcase cover 62. The drive chain driving sprocket 33 is covered with a drive sprocket cover 102 from outside. A part of this drive sprocket cover 102 is stacked on the crankcase cover 62 from outside. The part of this drive sprocket cover 102 is fastened to the left case half body 28L of the crankcase 28 together with the crankcase cover 62. In the embodiment, the drive sprocket cover 102 integrally includes mounting protrusions 102a, 102b arranged at two positions divided to a lower portion and an upper portion of a front portion of the drive sprocket cover 102. The lower mounting protrusion 102a is fastened to the left case half body 28L of the crankcase 28 by a bolt 103. The upper mounting protrusion 102b is fastened to the left case half body 28L of the crankcase 28 together with the crankcase cover 62 by a bolt 104.

As clearly illustrated in FIG. 7, between the drive sprocket cover 102 and the crankcase cover 62, a chain guiding member 105 that guides the drive chain 35 is clamped. The rod supporting portion 62a formed on the crankcase cover 62 is arranged at a position separating from the chain guiding member 105 in the direction along the axis of the output shaft 32, a position separating outside in the embodiment.

The following describes an operation of the embodiment. The generator 58 driven by the crankshaft 51, and the clutch 59 interposed between the crankshaft 51 and the transmission 52 are distributed and arranged at opposite sides in the axial direction of the crankshaft 51 rotatably supported to the crankcase 28. The cylinder body 29 having the cylinder bore 56 is combined with the crankcase 28. The starting power transmission mechanism 64 is arranged between the cylinder bore 56 and the generator 58 in the direction along the axis of the crankshaft 51. The starting power transmission mechanism 64 transmits starting power from the starter motor 63 to the crankshaft 51. The starter motor 63 is mounted on the outer surface of the crankcase 28. The crankcase cover 62 is mounted on the crankcase 28 at the opposite side of the clutch 59. The crankcase cover 62 covers the generator 58 and the starting power transmission mechanism 64. The release rod 98 of the clutch release lever 97 is turnably supported to the crankcase cover 62 at the side position of the generator 58. The clutch release lever 97 switches the transmission and the cutoff of power of the clutch 59. Accordingly, this can reduce an outward extension of the crankcase cover 62 to ensure a disposing space of the clutch release lever 97 on the crankcase cover 62 side. This can also reduce an outward extension of the clutch cover 87 so as to contribute to downsizing of the internal combustion engine E in the axial direction of the crankshaft 51.

The cam chain driving sprocket 84 is disposed at the crankshaft 51 so as to mesh with the cam chain 83. The cam chain driving sprocket 84 is arranged between the cylinder bore 56 and the clutch 59 in the direction along the axis of the crankshaft 51. Accordingly, this can arrange the generator 58 and the starting power transmission mechanism 64 more adjacent to the cylinder bore 56 side. This can also arrange the clutch release lever 97 at a side closer to the crankcase 28. Thus, this can more contribute to the downsizing of the internal combustion engine E in the axial direction of the crankshaft 51.

The drive chain driving sprocket 33 is secured to the output shaft 32 of the transmission 52 outside the crankcase cover 62. The drive chain driving sprocket 33 meshes with the drive chain 35 that transmits the rotative power from the crankshaft 51 to the rear wheel WR. A part of the drive sprocket cover 102 is stacked on the crankcase cover 62 from outside and fastened to the crankcase 28 together with the crankcase cover 62. The drive sprocket cover 102 covers the drive chain driving sprocket 33 from outside. Accordingly, this can ensure easily a disposing space of a fastening boss of the crankcase cover 62 and the drive sprocket cover 102 in the crankcase 28 and enhance maintainability.

The chain guiding member 105 is clamped between the drive sprocket cover 102 and the crankcase cover 62. The chain guiding member 105 guides the drive chain 35. The rod supporting portion 62a is arranged at the position separating from the chain guiding member 105 in the direction along the axis of the output shaft 32. The rod supporting portion 62a is formed on the crankcase cover 62 so as to turnably support the release rod 98 of the clutch release lever 97. Accordingly, this can reduce transmission of an excessive load from the chain guiding member 105 to the rod supporting portion 62a caused by bulge of the drive chain 35, so as to smooth turning movement of the clutch release lever 97.

A part of the starting power transmission mechanism 64 is configured with the first intermediate gear 67 and the second intermediate gear 68. The first intermediate gear 67 rotates around the axis parallel to the crankshaft 51. The second intermediate gear 68 is formed having the diameter smaller than the diameter of the first intermediate gear 67 and rotates with the first intermediate gear 67. The release rod 98 and the first and second intermediate gears 67, 68 are arranged adjacently so as to sandwich the first intermediate gear 67 between the release rod 98 and the second intermediate gear 68 in the direction along the rotation axes of the first and second intermediate gears 67, 68. Accordingly, this allows the starting power transmission mechanism 64 and the clutch release lever 97 to be arranged adjacently by sandwiching the crankcase cover 62, so as to ensure more downsizing of the internal combustion engine E.

Further, the starting power transmission mechanism 64 includes the driven gear 70 and the third intermediate gear 69. The driven gear 70 is coaxial with the crankshaft 51. The third intermediate gear 69 meshes with the second intermediate gear 68. The support plate 75 is arranged between the first and second intermediate gears 67, 68 on the projection view to the planar surface including the axis of the support shaft 74 and the rotation axes of the first and second intermediate gears 67, 68. The support plate 75 supports the support shaft 74 and is secured to the crankcase 28. The support shaft 74 rotatably supports the third intermediate gear 69. Accordingly, this can downsize the driven gear 70 to bring the first and second intermediate gears 67, 68 closer to the crankshaft 51 side with the configuration that interposes the third intermediate gear 69 between the second intermediate gear 68 and the driven gear 70. This can also contribute to the downsizing of the internal combustion engine E.

The embodiment of the present invention has been described above. The present invention is not limited to the above-described embodiment. Various changes of design are possible without departing from the gist of the present invention.

What is claimed is:

1. An internal combustion engine for a saddle-ride type vehicle, in which a generator driven by a crankshaft and a clutch interposed between the crankshaft and a transmission are distributed and arranged on opposite sides in an axial direction of the crankshaft rotatably supported to a crankcase, and a cylinder body having a cylinder bore is combined with the crankcase,
wherein:
a starting power transmission mechanism is arranged between the cylinder bore and the generator in a direction along an axis of the crankshaft, the starting power transmission mechanism transmitting starting power from a starter motor to the crankshaft, the starter motor being mounted on an outer surface of the crankcase,
a crankcase cover is mounted on the crankcase on a side opposite to the clutch, the crankcase cover covering the generator and the starting power transmission mechanism,
a release rod of a clutch release lever is turnably supported to the crankcase cover at a side position of the generator, the clutch release lever switching transmission and cutoff of power of the clutch,
a cam chain driving sprocket is disposed at the crankshaft so as to mesh with a cam chain, the cam chain driving sprocket being arranged between the cylinder bore and the clutch in the direction along the axis of the crankshaft,
a chain guiding member is clamped between the drive sprocket cover and the crankcase cover, the chain guiding member guiding the drive chain, and
a rod supporting portion is arranged at a position separating from the chain guiding member in a direction along an axis of the output shaft, the rod supporting portion being formed on the crankcase cover so as to turnably support the release rod of the clutch release lever.

2. An internal combustion engine for a saddle-ride type vehicle, in which a generator driven by a crankshaft and a clutch interposed between the crankshaft and a transmission are distributed and arranged on opposite sides in an axial direction of the crankshaft rotatably supported to a crankcase, and a cylinder body having a cylinder bore is combined with the crankcase,
wherein:
a starting power transmission mechanism is arranged between the cylinder bore and the generator in a direction along an axis of the crankshaft, the starting power transmission mechanism transmitting starting power from a starter motor to the crankshaft, the starter motor being mounted on an outer surface of the crankcase, a crankcase cover is mounted on the crankcase on a side opposite to the clutch, the crankcase cover covering the generator and the starting power transmission mechanism, a release rod of a clutch release lever is turnably supported to the crankcase cover at a side position of the generator, the clutch release lever switching transmission and cutoff of power of the clutch, a drive chain driving sprocket is secured to an output shaft of the transmission outside the crankcase cover, the drive chain driving sprocket meshing with a drive chain that transmits rotative power from the crankshaft to a drive wheel, a part of a drive sprocket cover is stacked on the crankcase cover from outside and fastened to the crankcase together with the crankcase cover, the drive sprocket cover covering the drive chain driving sprocket from outside, a chain guiding member is clamped between the drive sprocket cover and the crankcase cover, the chain guiding member guiding the drive chain, and a rod supporting portion is arranged at a position separating from the chain guiding member in a direction along an axis of the output shaft, the rod supporting portion being formed on the crankcase cover so as to turnably support the release rod of the clutch release lever.

3. An internal combustion engine for a saddle-ride type vehicle, in which a generator driven by a crankshaft and a clutch interposed between the crankshaft and a transmission are distributed and arranged on opposite sides in an axial direction of the crankshaft rotatably supported to a crankcase, and a cylinder body having a cylinder bore is combined with the crankcase, wherein:

a starting power transmission mechanism is arranged between the cylinder bore and the generator in a direction along an axis of the crankshaft, the starting power transmission mechanism transmitting starting power from a starter motor to the crankshaft, the starter motor being mounted on an outer surface of the crankcase, a crankcase cover is mounted on the crankcase on a side opposite to the clutch, the crankcase cover covering the generator and the starting power transmission mechanism, a release rod of a clutch release lever is turnably supported to the crankcase cover at a side position of the generator, the clutch release lever switching transmission and cutoff of power of the clutch, a part of the starting power transmission mechanism is configured with a first intermediate gear and a second intermediate gear, the first intermediate gear rotating around an axis parallel to the crankshaft, the second intermediate gear being formed having a diameter smaller than a diameter of the first intermediate gear and rotating with the first intermediate gear, the release rod and the first and second intermediate gears are arranged adjacently so as to sandwich the first intermediate gear between the release rod and the second intermediate gear in a direction along rotation axes of the first and second intermediate gears, the starting power transmission mechanism includes a driven gear and a third intermediate gear, the driven gear being coaxial with the crankshaft, the third intermediate gear meshing with the second intermediate gear, and a support plate is arranged between the first and second intermediate gears on a projection view to a planar surface including an axis of a support shaft and the rotation axes of the first and second intermediate gears, the support plate supporting the support shaft and being secured to the crankcase, the support shaft rotatably supporting the third intermediate gear.

4. The internal combustion engine for the saddle-ride type vehicle according to claim 1, wherein a drive chain driving sprocket is secured to an output shaft of the transmission outside the crankcase cover, the drive chain driving sprocket meshing with a drive chain that transmits rotative power from the crankshaft to a drive wheel, and a part of a drive sprocket cover is stacked on the crankcase cover from outside and fastened to the crankcase together with the crankcase cover, the drive sprocket cover covering the drive chain driving sprocket from outside.

5. The internal combustion engine for the saddle-ride type vehicle according to claim 1, wherein a part of the starting power transmission mechanism is configured with a first intermediate gear and a second intermediate gear, the first intermediate gear rotating around an axis parallel to the crankshaft, the second intermediate gear being formed having a diameter smaller than a diameter of the first intermediate gear and rotating with the first intermediate gear, and the release rod and the first and second intermediate gears are arranged adjacently so as to sandwich the first intermediate gear between the release rod and the second intermediate gear in a direction along rotation axes of the first and second intermediate gears.

6. The internal combustion engine for the saddle-ride type vehicle according to claim 1, wherein on a projection view seen in a direction perpendicular to the axis of the crankshaft, part of gears forming the starting power transmission mechanism is overlapped with the clutch release lever.

7. The internal combustion engine for the saddle-ride type vehicle according to claim 6, wherein a drive chain driving sprocket is secured to an output shaft of the transmission outside the crankcase cover, the drive chain driving sprocket meshing with a drive chain that transmits rotative power from the crankshaft to a drive wheel, and a part of a drive sprocket cover is stacked on the crankcase cover from outside and fastened to the crankcase together with the crankcase cover, the drive sprocket cover covering the drive chain driving sprocket from outside.

8. The internal combustion engine for the saddle-ride type vehicle according to claim 6, wherein a part of the starting power transmission mechanism is configured with a first intermediate gear and a second intermediate gear, the first intermediate gear rotating around an axis parallel to the crankshaft, the second intermediate gear being formed having a diameter smaller than a diameter of the first intermediate gear and rotating with the first intermediate gear, and the release rod and the first and second intermediate gears are arranged adjacently so as to sandwich the first intermediate gear between the release rod and the second intermediate gear in a direction along rotation axes of the first and second intermediate gears.

9. The internal combustion engine for the saddle-ride type vehicle according to claim 8,
   wherein the starting power transmission mechanism includes a driven gear and a third intermediate gear, the driven gear being coaxial with the crankshaft, the third intermediate gear meshing with the second intermediate gear, and
   a support plate is arranged between the first and second intermediate gears on a projection view to a planar surface including an axis of a support shaft and the rotation axes of the first and second intermediate gears, the support plate supporting the support shaft and being secured to the crankcase, the support shaft rotatably supporting the third intermediate gear.

* * * * *